350-370 SR

XR 3,694,656

Henning

[15] 3,694,656

[45] Sept. 26, 1972

[54] BALANCED OPTICAL DEMODULATOR

[72] Inventor: Harley B. Henning, Sharon, Mass.

[73] Assignee: Raytheon Company, Lexington, Mass.

[22] Filed: Oct. 28, 1970

[21] Appl. No.: 84,710

[52] U.S. Cl. ....................250/199, 250/225, 350/147

[51] Int. Cl. ....................H04b 9/00

[58] Field of Search ..............250/199, 225; 350/147; 356/141, 152, 4, 5, 28, 29; 329/144

[56] References Cited

UNITED STATES PATENTS

| | | | |
|---|---|---|---|
| 3,590,249 | 6/1971 | Rabedeau | 250/199 |
| 3,440,424 | 4/1969 | Buhrer | 250/199 |
| 3,569,996 | 3/1971 | Goell et al. | 250/199 |
| 3,284,632 | 11/1966 | Niblack et al. | 250/199 |

*Primary Examiner*—Benedict V. Safourek
*Attorney*—Philip J. McFarland and Joseph D. Pannone

[57] ABSTRACT

A demodulator for optical signals, the contemplated demodulator including a polarizer and mirror arrangement for combining the signals to be demodulated and optical local oscillator signals into a first and a second composite beam, the first beam being modulated in a manner corresponding to the algebraic sum of the signals to be detected and the optical local oscillator signals and the second beam being modulated in a manner corresponding to the algebraic difference between such signals. Each composite beam is directed to a different photodetector and the difference signal between the electrical output signals of the photodetectors is derived. Such difference signal, which is proportional only to the product of the signals to be demodulated and a constant related to the optical local oscillator signals, may then be processed to derive the desired demodulated signals.

1 Claim, 1 Drawing Figure

3694656

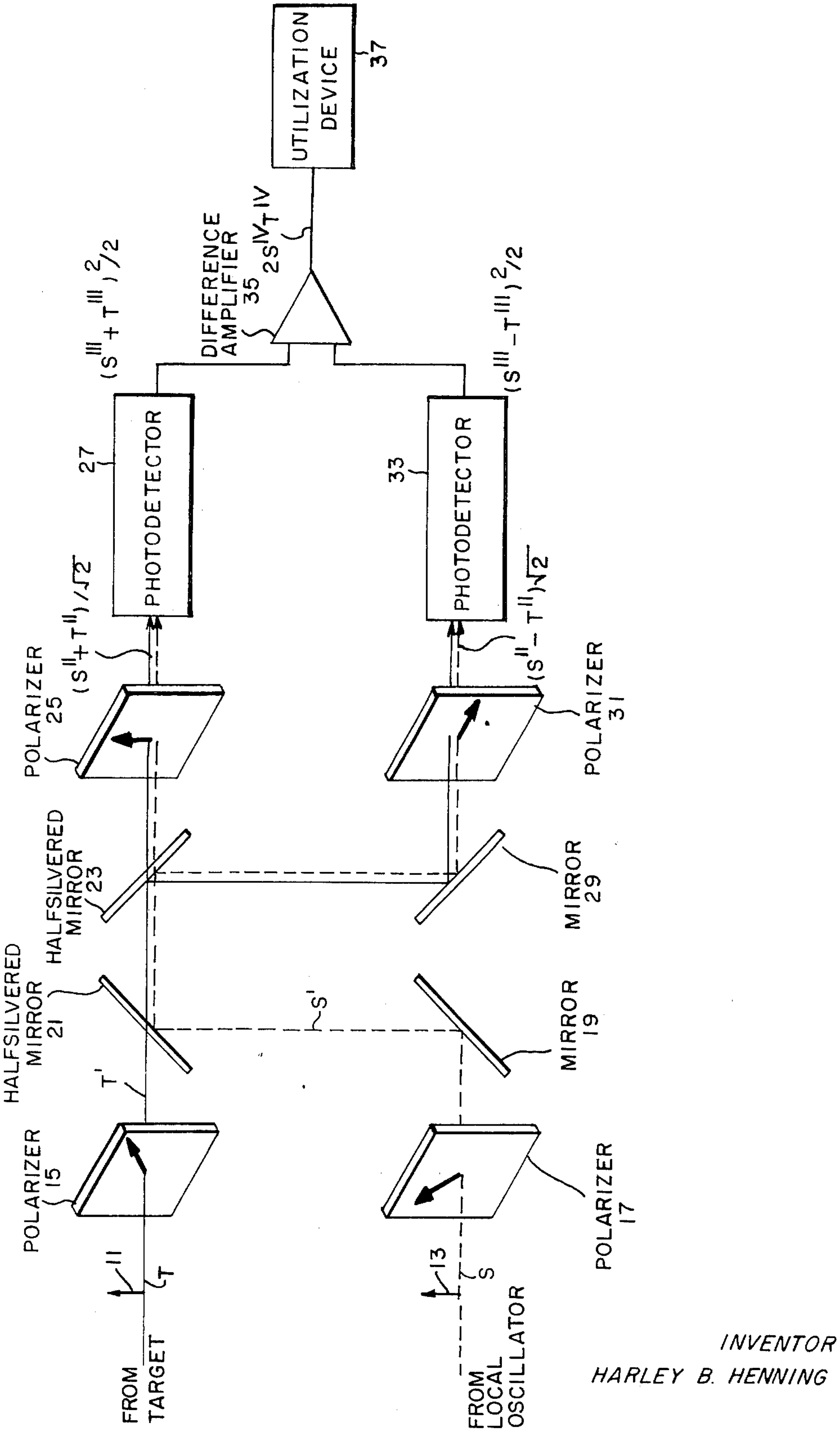
INVENTOR
HARLEY B. HENNING

BALANCED OPTICAL DEMODULATOR

BACKGROUND OF THE INVENTION

This invention pertains generally to laser systems and particularly to the receiving portion of such systems.

It is known in the art that coherent optical detection of signals may be accomplished by photomixing received optical signals with reference optical signals to obtain relatively low frequency electrical difference signals. The reference optical signals may be offset in frequency from the frequency of the received optical signals, so that the photomixing process becomes analogous to conventional heterodyning in microwave systems, or the frequency of the two signals to be photomixed may be the same in a manner analogous to homodyning. In either case, when optical signals are demodulated in a simple square-law demodulator, as a phototube, the desired output signals alone are not obtained. That is, in addition to the product signals resulting from photomixing of the received optical signals and the reference signals, unwanted, and sometimes interfering, signals are also derived.

SUMMARY OF THE INVENTION

Therefore, it is a primary object of this invention to provide an improved optical demodulator for a laser system to produce only the desired product signals resulting from photomixing of return signals and optical local oscillator signals.

Another object of this invention is to provide an improved optical demodulator for a laser system to accomplish the primary object hereof with conventional known elements.

The foregoing and other objects of this invention are attained by deriving, from a difference amplifier, electrical signals from which the undesired portions of the signals from a pair of photodetectors have been cancelled, one of the photodetectors being actuated by optical signals indicative of the algebraic sum of the optical signals to be demodulated and reference optical signals and the other one of the photodetectors being actuated by optical signals indicative of the algebraic difference between such optical signals. The requisite algebraic sum and difference optical signals are derived by passing the optical signals to be demodulated and the reference optical signals through a mirror and polarizer arrangement.

BRIEF DESCRIPTION OF THE DRAWING

For a more complete understanding of this invention, reference is now made to the following description of a preferred embodiment illustrated in the accompanying drawing, the single FIGURE of which shows how the various elements making up the contemplated demodulator may be disposed to effect the desired cancellation of unwanted components from the output signals of photodetectors.

DESCRIPTION OF THE PREFERRED EMBODIMENT

Before referring to the Figure, it will be noted that only the arrangement of an optical demodulator has been shown for simplicity of illustration. The requisite laser transmitter and polarizer to transmit plane polarized light signals and frequency translator for a portion of such light to provide plane polarized optical local oscillator signals are deemed to be so well known in the art that the invention may be understood without a showing of such elements. Suffice it to say here that the optical signals from the laser transmitter after reflection from a target (not shown) are returned to the illustrated electrooptical configuration with a polarization which is parallel to the polarization of the optical signal from the optical local oscillator.

Thus, return signals, hereinafter designated by the letter T, enter the illustrated demodulator with a polarization indicated by the arrow 11. At the same time, optical local oscillator signals, hereinafter designated by the letter S, enter the illustrated demodulator with the same polarization, indicated by the arrow 13. Signals T are passed in any convenient way (not shown) to a polarizer 15, which has its polarization axis oriented, as indicated, at an angle of +45° with respect to arrow 11. Signals S are passed, again in any convenient manner (not shown) to a polarizer 17 which has its polarization axis oriented, as indicated, at any angle of −45° with respect to arrow 13. The polarization of the optical signals S′, T′ out of the polarizers 15, 17 are, therefore, mutually orthogonal. Optical signals S′ are passed, by reflection off a mirror 19, to a half-silvered mirror 21. Return signals T′ are passed directly to half-silvered mirror 21. It is obvious, therefore, that the mirror 19 and the half-silvered mirror 21 may be aligned so that a portion of the optical signals S′ and the return signals T′ may combine to form a composite beam (not numbered). It is also obvious that such beam is made up of two mutually orthogonal polarized components corresponding, respectively, to S′ and T′. Such beam is passed to a half-silvered mirror 23, whereby it is divided into two portions, the first passing through a polarizer 25 to a photodetector 27 and the second, after reflection from a mirror 29, passing through a polarizer 31 to a photodetector 33. The polarization axis of polarizer 25 is aligned midway between the direction of polarization of optical signals S′, T′, i.e. parallel to the direction of polarization of the return signals, T. The polarization axis of polarizer 31 is orthogonal to the polarization axis of polarizer 25 as shown. It follows, then, that the optical signals falling photodetector 27, such signals being indicated as $(S'' + T'')/\sqrt{2}$, are proportional to the algebraic sum of the return signals, T, and the optical local oscillator signals, S; and the optical signals falling on photodetector 33 are proportional to the algebraic difference, indicated by $(S'' - T'')/\sqrt{2}$ of signals $S$, $T$.

Photodetectors 27, 33, each of which is a conventional square-law device, produce electrical signals indicated, respectively, as signals $(S''' + T''')^2/2$ and $(S''' - T''')^2/2$. Such electrical signals are passed to a difference amplifier 35, wherein the undesired components, i.e. all components, other than the product component, in the electrical signals out of the photodetector 27, 37, are cancelled. The electrical signals out of the difference amplifier 35 are, therefore, $2S^{IV}T^{IV}$ as shown. Because $S^{IV}$ (having been derived from the optical local oscillator signals, $S$) is a constant, it is obvious that variations in the signals out of the difference amplifier 35 are directly related to variations in the return signals, $T$. Therefore, the electrical signals out of the difference amplifier 35 may be passed to a utilization device 37 of conventional construction and processed to obtain an indication of the variations in the return signals, *T*, without distortion by reason of the nonlinear processes other than the desired multiplication process inherent in the operation of photodetectors.

Having described a preferred embodiment of this invention, it will be apparent to those of skill in the art that many changes may be made without departing from my inventive concepts. For example, it is not essential to the invention that the polarization of the return signals, *T*, and the optical local oscillator signals, S, be the same. It is apparent that, if a difference in orientation of polarization of the return signals and the optical local oscillator signals exists, then the polarizers 15, 17 will permit passage only of mutually orthogonal components. As a matter of fact, if the polarization of the return signals *T* and the optical local oscillator signals *S* are initially orthogonal one to the other the polarizers 15, 17 may be eliminated. It is felt, therefore, that the invention should not be restricted to its disclosed embodiment but rather should be limited only by the spirit and scope of the appended claims.

What is claimed is:

1. In a demodulator wherein an electrical signal representative of the product of two optical signals from different sources is derived, the improvement comprising:

a. first and second polarizer means, each responsive to a different one of the two optical signals, for producing separate linearly polarized optical signals having mutually orthogonal polarizations;

b. means for forming first and second composite optical signals from the linearly polarized optical signals, such first and second composite optical signals being substantially identical to one another;

c. third and fourth polarizer means, responsive respectively to the first and the second composite optical signals, for forming third and fourth composite optical signals, the third composite optical signals being indicative of the sum of the linearly polarized optical signals in the first composite optical signals and the fourth composite optical signals being indicative of the difference between the linearly polarized optical signals in the second composite optical signals;

d. photodetector means, responsive respectively to the third and the fourth composite optical signals, for producing first and second electrical signals, the first electrical signals being indicative of the square of the sum of the linearly polarized optical signals in the first composite optical signals and the second electrical signals being indicative of the square of the difference of the linearly polarized optical signals in the second composite optical signals; and e. differencing means, responsive to the first and the second electrical signals, for producing third electrical signals indicative of the product of the two optical signals.

* * * * *